(12) United States Patent  
Gandhi

(10) Patent No.: US 9,426,422 B2  
(45) Date of Patent: Aug. 23, 2016

(54) MULTI-DISPLAY VIDEO CONFERENCING

(71) Applicant: PayPal, Inc., San Jose, CA (US)

(72) Inventor: Saumil Ashvin Gandhi, Sunnyvale, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 14/553,784

(22) Filed: Nov. 25, 2014

(65) Prior Publication Data

US 2016/0150184 A1    May 26, 2016

(51) Int. Cl.
*H04N 7/15* (2006.01)

(52) U.S. Cl.
CPC ........................ *H04N 7/15* (2013.01)

(58) Field of Classification Search
CPC ......... H04N 7/14; H04N 7/141; H04N 7/142; H04N 7/144; H04N 2007/145; H04N 7/15; H04N 7/152; H04N 7/155
See application file for complete search history.

(56) References Cited

U.S. PATENT DOCUMENTS

| | | | |
|---|---|---|---|
| 5,796,577 A | 8/1998 | Ouchi et al. | |
| 6,667,878 B2 | 12/2003 | Ponx | |
| 7,136,282 B1 | 11/2006 | Rebeske | |
| 8,638,354 B2 * | 1/2014 | Leow | H04N 7/142 348/14.01 |
| 2005/0253775 A1 | 11/2005 | Stewart | |
| 2006/0236014 A1 * | 10/2006 | Yin | G06F 1/1616 710/303 |
| 2010/0315481 A1 * | 12/2010 | Wijngaarden | H04N 7/142 348/14.07 |
| 2013/0063539 A1 * | 3/2013 | Sakuraba | H04N 7/142 348/14.02 |
| 2013/0106976 A1 * | 5/2013 | Chu | H04L 65/1069 348/14.02 |

FOREIGN PATENT DOCUMENTS

CN          202171772 U     3/2012

* cited by examiner

*Primary Examiner* — Stella L Woo  
(74) *Attorney, Agent, or Firm* — Schwegman Lundberg & Woessner, P.A.

(57) ABSTRACT

Disclosed are a system comprising a computer-readable storage medium storing at least one program, and a computer-implemented method for facilitating multi-display video conferences. An audio-video interface module receives first and second audio input data and first and second video input data of a video conference session. The first audio input data and the first video input data are linked to a first display device of a first user device. The second audio input data and the second video data are linked to a second display device of the first user device. A speaker detector module processes, based on a determination that the first and second audio input data are linked to the first user device, the first and second audio input data to identify an active audio signal to be displayed in an active speaker display frame on a second user device.

19 Claims, 11 Drawing Sheets

MULTI-DISPLAY VIDEO CONFERENCING

TECHNICAL FIELD

Example embodiments of the present application relate generally to video conferencing and, more particularly in an embodiment, to facilitating multiple displays for video conferencing.

BACKGROUND

A personal computer (PC) can provide video conferencing capabilities over a network. The PC can include a camera and a microphone to capture video and audio of its user. The PC can transmit the captured audio-video data over a network to the other participants of the video conference. Moreover, video streams of the other participants can be transmitted to the PC, which can display the videos of the users on a monitor of the PC. Some video conference applications allow users to share screens so that the users can see a representation of the shared display.

BRIEF DESCRIPTION OF THE DRAWINGS

In the drawings, which are not necessarily drawn to scale, like numerals can describe similar components in different views. Like numerals having different letter or numeric suffixes can represent different instances of similar components. The drawings illustrate generally, by way of example, but not by way of limitation, various embodiments discussed in the present document.

DETAILED DESCRIPTION

Figure 1:
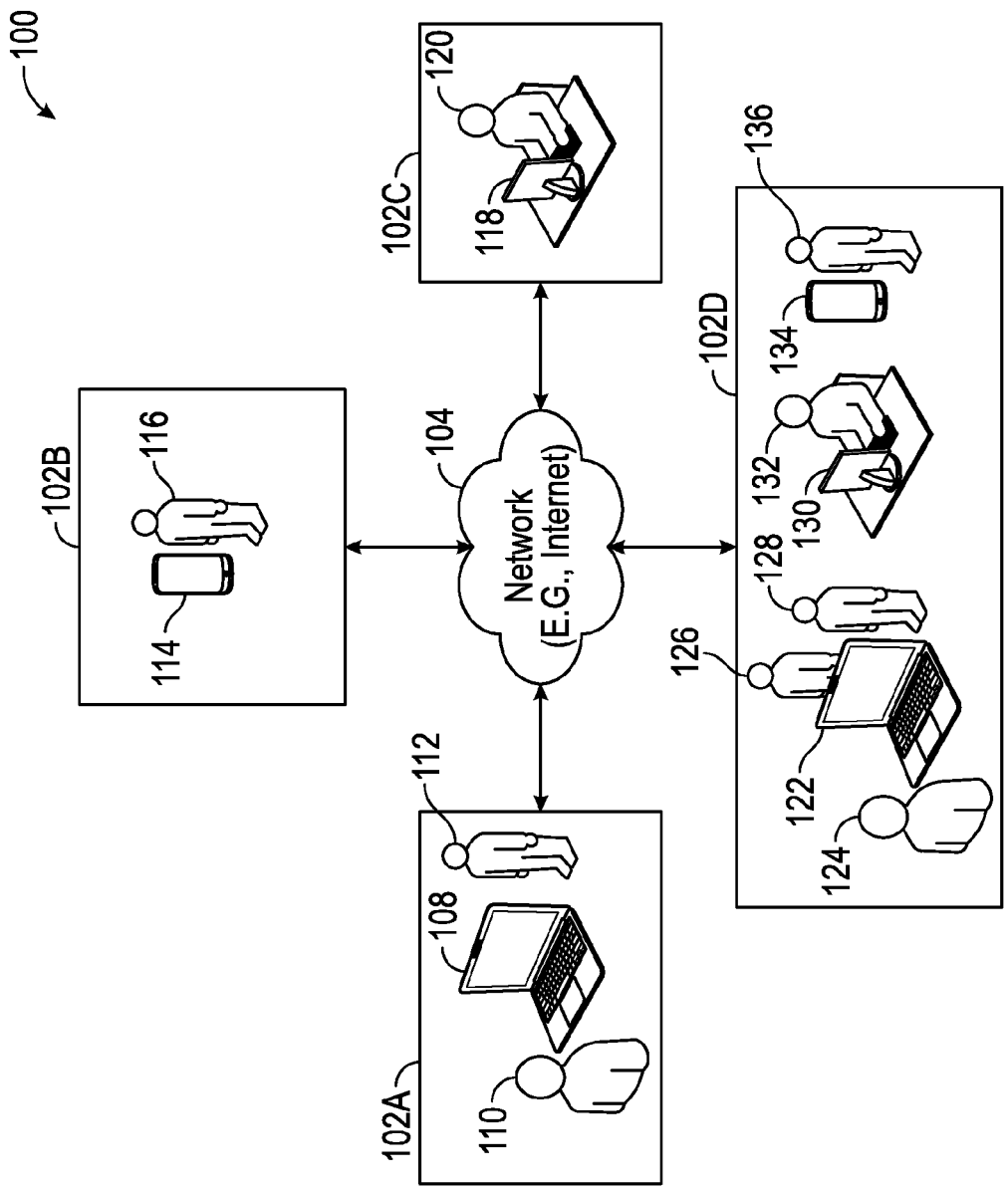
FIG. 1 is a network diagram depicting a network system, within which one example embodiment can be deployed.

Reference will now be made in detail to specific example embodiments for carrying out the inventive subject matter. Examples of these specific embodiments are illustrated in the accompanying drawings. It will be understood. that they are not intended to limit the scope of the claims to the described embodiments. On the contrary, they are intended to cover alternatives, modifications, and equivalents as can be included within the spirit and scope of the disclosure as defined by the appended claims. In the following description, specific details are set forth in order to provide a thorough understanding of the subject matter. Embodiments can be practiced without some or all of these specific details. In addition, well known features may not have been described in detail to avoid unnecessarily obscuring the subject matter.

In accordance with the present disclosure, components, process steps, and/or data structures are implemented using various types of operating systems (OSs), programming languages, computing platforms, computer programs, and/or like machines. In addition, those of ordinary skill in the art will recognize that devices, such as hardwired devices, field programmable gate arrays (FPGAs), application specific integrated circuits (ASICs), or the like, based on technical considerations of the application, can also be used without departing from the scope and spirit of the concepts disclosed herein. Based on technical considerations of the application, embodiments can also be tangibly embodied as a set of computer instructions stored on a computer readable medium, such as a memory device.

Example methods and systems for multi-display video conferencing, which are embodied on electronic devices, are described. In the following description, for purposes of explanation, numerous specific details are set forth in order to provide a thorough understanding of example embodiments. it will be evident, however, to one skilled in the art that the present inventive subject matter can be practiced without these specific details.

In an example embodiment, a PC, such as a laptop, desktop, tablet, or the like, can provide two or more separate displays to facilitate, for example, a video conference session with at least two or more users at a location. For instance, a first user can use a first display device that renders a first display, and a second user can use a second display device that renders a second display. The displays can be mirrored versions of each other or they can be different displays, for instance, to account for differences in the display types and/or to control what information is presented to which users.

The PC can include two display devices, such as an integrated front-facing liquid-crystal display (LCD) device and an integrated rear-facing LCD device. For instance, a laptop can include two LCD devices, one being integrated in the front panel and one being integrated on the back panel. In another embodiment, the PC can include one display device and can be coupled to a second device, such as a smart phone, a tablet, a second PC, or a like device having its own display device. The second device can couple to the PC using a wired or wireless connection that provides display data from the PC to the second device for displaying a video conference interface to the second user.

Providing two or more displays using the same PC can facilitate video conferencing with two or more users in the same location. In some situations, for instance, it can be more convenient for the first and second users to use the same PC. For example, where the location of first and second user corresponds to the first user's office or home, it can be inconvenient for the second user to bring a second PC to the first user's location. Additionally or alternatively, the video conference can be unplanned and the first and second users may have just one PC that is available and/or has the resources for the video conference. As will be appreciated, one or more of the example embodiments described herein can facilitate an efficient way for the two or more users to participate in a video conference together.

Methods and systems described, herein can have one or more technical effects related to facilitating multiple users using the same electronic user device (such as a PC) during a digital video conference session over a communication network (e.g., the Internet, cellular, and/or the like). Example aspects, among others, of some embodiments include determining an active speaker between the two users, determining the display data for each of the two displays, and sharing and assigning user input devices to the two or more users.

FIG. 1 is a network diagram depicting a network system 100, within which one example embodiment can be deployed. A number of users at network access nodes 102A-D can participate in a video conference session over a network 104 (e.g., the Internet, cellular, or Wide Area Network (WAN)). FIG. 1 illustrates that the network access nodes 102A-D can support various numbers of users and devices, as well as various types of devices.

For example, at the network access node 102A, a user device 108, such as a laptop, can execute a multi-display video conferencing application for two users 110, 112. The user 110 can correspond to an "operator" or "primary user," and the user 112 can correspond to an "observer" or "secondary user." For example, the user 110 can operate the user device using a front-facing display of the user device 108. Moreover, the user 110 can operate the user device 108 using a key board and trackpad or other pointing device. The user 110 can set up a video conference application that provides a second display for the user 112. The second display can be rendered on a second display device, such as a rear-facing display. As such, the user device 108 can facilitate a video conference for both users 110, 112 who can participate in the video conference by viewing their respective displays of the user device 108.

A number of users who are remote to the users 110, 112 can participate in the video conference via the network 104. For example, at the network access node 102B, a user device 114, such as a mobile phone, executes a video conference application for a single user 116. At the network access node 102C, a user device 118, such as a desktop computer, can execute a video conference application for a single user 120. At the network access node 102D, the user device 122 executes a multi-display video conference application for users 124, 126, 128. The user 124 can correspond to the operator user. The users 126, 128 can correspond to the secondary users. Each of the observer users can have separate displays or can share the same display. The user device 130, such as a desktop computer, executes a video conference application for user 132. The user device 134, such as a mobile phone, executes a video conference application for the user 136. The video conference applications executed by the user devices 114, 118, 130, 134 can correspond to a multi-display video conference application or a single display video conference application.

The user device 108 can provide video and audio input data of the respective users 110, 112 to the network 104 for transmission to other users of the video conference. The video and audio data streams can include video images and audio data that are captured by separate recording devices coupled to the user device 108, as will be described in greater detail in connection with FIGS. 2A-2G.

Because the user device 108 provides the video and audio input data for both users 110, 112, the video and audio input data are linked to the same user device 108. For example, the video and audio data for both users 110, 112 can be linked, to the network address (e.g., IP address) of the user device 108 or by identification data that is indicative of the user device 108. Furthermore, because the user device 108 can be linked to more than one user, each of the audio data input data and the video input data can be linked to the corresponding user by identification data that is indicative of the corresponding user to which the input data is linked. Moreover, the user device 108 can receive video and audio data streams for display of other users of the video conference via the network 104.

The audio input data linked to the user device 108 can be processed together to determine the active speaker of the group of users. The microphones coupled to the user device 108, in some example embodiments, can be in close proximity to each other and thus can produce similar audio data. As such, the audio input data associated with the user device 108 can be processed together in a way that is robust to the similarity of audio input data to identify slight differences (e.g., phase shifts and/or time delays) between the audio data streams generated by closely positioned microphones.

In one example aspect, the processing of the audio input data of multiple users can determine "directionality" of the signal to determine which microphone of the user device is closest to the source of the audio input. The audio input data linked to the microphone closest to the source can be selected as the active audio signal (e.g., the audio input data linked to the user who is the active speaker).

The processing of audio input data associated with the same user device can be different from the processing of audio input data of different user devices, such as between users 112, 116, which latter processing can be performed, e.g., by comparing the strength of the respective audio input signals and may not consider directionality of the audio input data.

Accordingly, the audio input data that is linked to the same user device (e.g., providing multi-display video conferencing) can be processed as a group to identify an active speaker of the group. The processing can be performed by the user device (e.g., user device 108) or can be performed by a server computer (not shown) connected to the network 104. The server computer can group received audio input data by user devices (e.g., as determined by network addresses or user device identifiers) and process the audio data streams linked to each user device separate from the other user devices to determine the active audio signal of the group.

As used herein, a "user device" executing a video conference application can correspond to one or more suitable computing devices, such as, but not limited to, a desktop computer, a laptop computer, a notebook computer, a mobile phone, a tablet computer, a wearable computer, and/or one or more of the like devices. In example embodiments, a user device is a single independent computer device. In alternative example embodiments, a user device can be composed of a plurality of independent computer devices interconnected by various communication channels.

Example User Devices For Multi-Display Conferencing

Figure 2A:
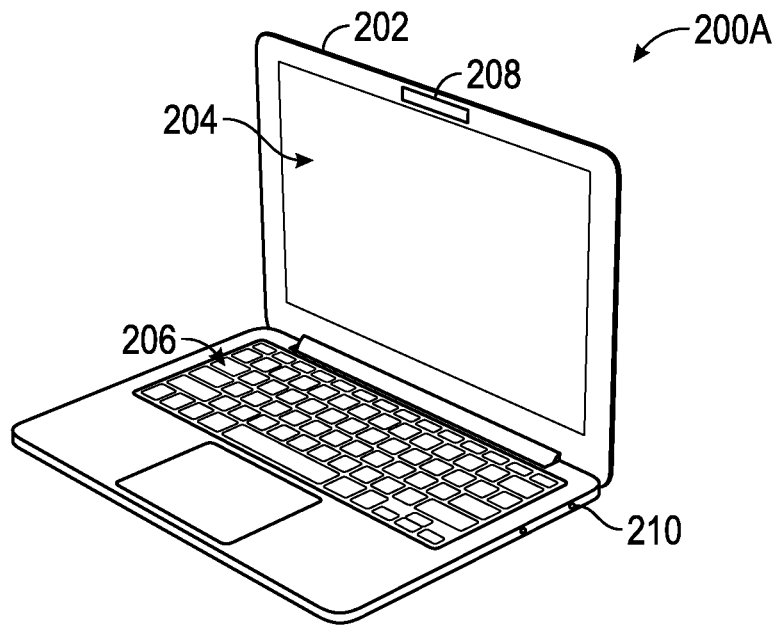
FIGS. 2A-2G are diagrams illustrating various example user devices, according to example embodiments.

FIGS. 2A-2G are schematic diagrams illustrating various example user devices and configurations, according to example embodiments. Elements common to the figures share common reference indicia, and only differences between the figures are described herein for the sake of brevity. FIG. 2A illustrates a perspective view 200A of a front portion of a user device 202, which can correspond to the user device 108 of FIG. 1. The user device 202 can include a first display device 204, user input devices 206, a recording device 208, and ports 210. The first display device 204 can be a front facing display for the user of the user device 202. The user input devices 206 can correspond to a keyboard and/or a trackpad integrated into the user device 202. Additionally or alternatively, the user input devices 206 can additionally or alternatively correspond to an element of the first display device 204 for providing touch screen capabilities. The recording device 208 can correspond to a camera and/or microphone for capturing video and/or audio. The ports 210 can facilitate physical, wired, or wireless connection with peripheral devices. The ports 210 can correspond to any suitable port, terminal, connector, transceiver, or like communication device for facilitating universal serial bus (USB), PS/2, BLUETOOTH, ZIGBEE, WiFi, FIRE WIRE, Ethernet, High-Definition Multimedia Interface (HDMI), Digital Visual Interface (DVI), Video Graphics Array (VGA), cellular, and the like types of communications.

Figure 2B:
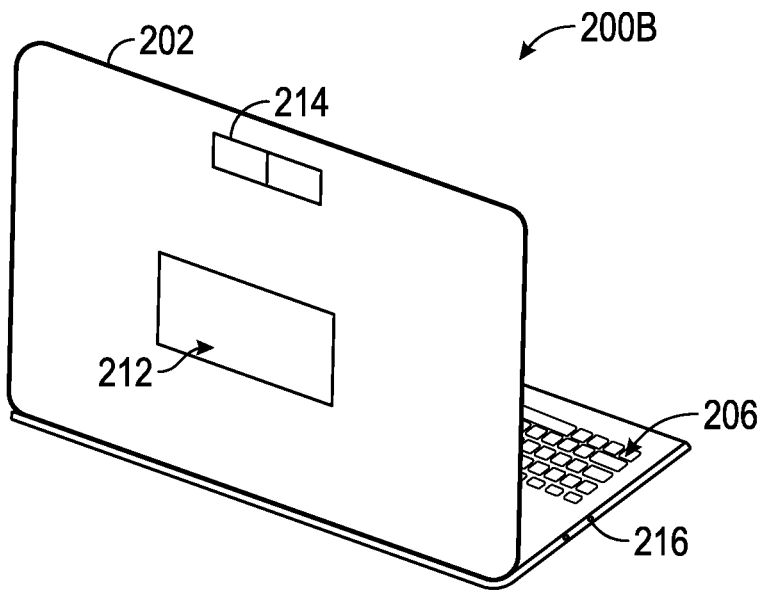

FIG. 2B illustrates a perspective view 200B of a rear portion of the user device 202 of FIG. 2A. The user device 202 can include the first display device 204 (not shown), the user input devices 206, the recording device 208 (not shown), and the ports 210 (not shown), as described in connection with FIG. 2A. Additionally, the user device 202 includes a second display 212 that is rear facing for users positioned behind the user device 202. Furthermore, the user device 202 includes a recording device 214 that is also rear facing for capturing audio and/or video of users placed behind the user device 202. As shown, the user device 202 can include additional ports 216, which can be similar to the ports 210.

The recording device 214 or one or more of a microphone and a camera of the recording device 214 can be omitted in alternative example embodiments. For instance, the recording device 214 can be omitted and video of the second user is not captured. As such, audio of the second user can be captured by a microphone of the recording device 208 or by a separate microphone (not shown) connected to the user device 202. Omitting a microphone, a camera, or both can reduce complexity and costs and can improve power efficiency.

Figure 2C:
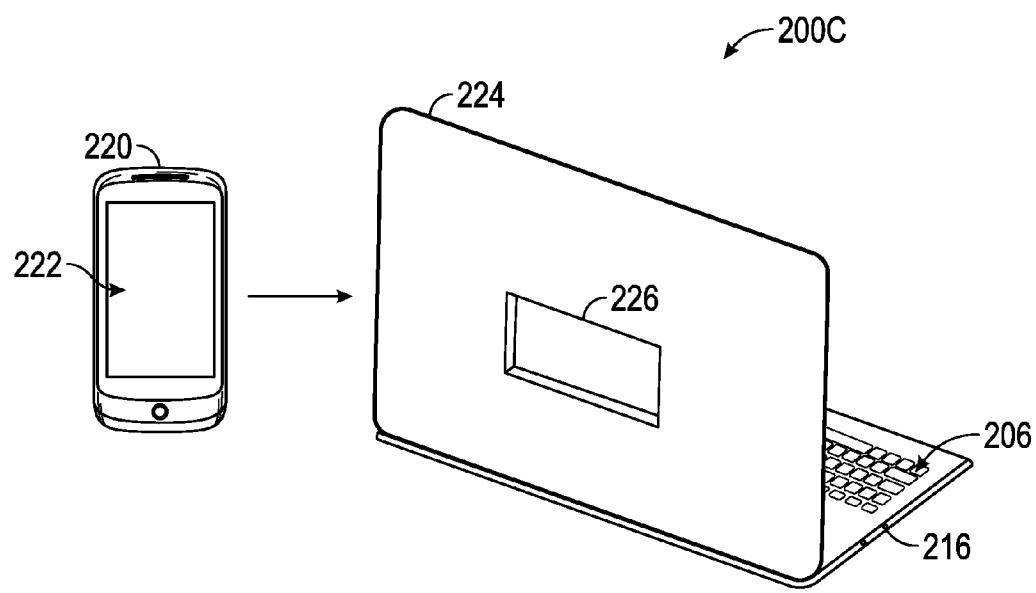
Figure 2D:
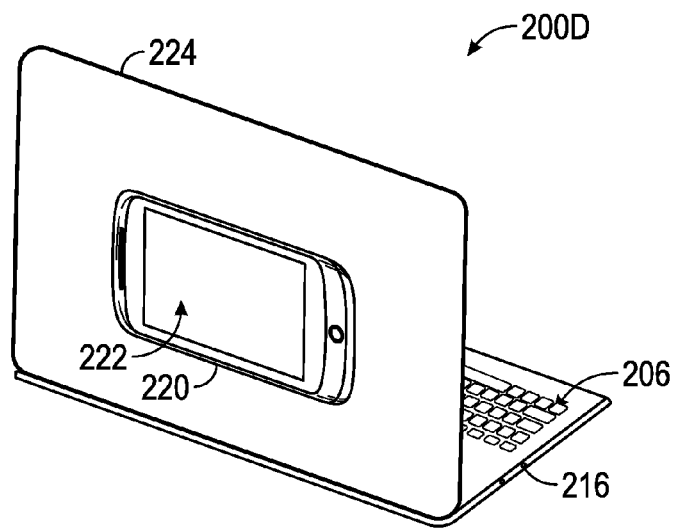

FIGS. 2C and 2D illustrate perspective views 200C, 200D of a user device 220 and a rear portion of a user device 224. FIGS. 2C and 2D illustrate an example embodiment in which a user device 220 (a second user device) can be used to provide a second display device 222 instead of using an integrated second display device in the first user device. In particular, the user device 220 can be connected with a user device 224 (e.g., the first user device). The user device 220 can correspond to any suitable user device with a display 222, such as a mobile phone. The user device 224 can correspond to another example embodiment of the user device 108 of FIG. 1.

The user device 220 can correspond to a separate and independent device from the user device 224. The user device 224 can include a portion 226 to receive and hold the user device 220 and to communicatively couple the user devices 220, 224. For example, FIG. 2D shows the configuration of the user devices 220, 224 coupled together by placing the user device 220 in the portion 226 of the user device 224. The portion 226 can correspond to a recessed section of the exterior side of the user device 224. It will be appreciated, however, in alternative embodiments that the portion 226 can correspond to any structure capable of keeping the user device 220 in place and orientated in a particular way (e.g., rear facing). For example, the portion 226 can correspond to clasps, mounting members, a foldout shelf, and the like. Moreover, the portion 226 can include a connector capable of physically connecting the user device 220 to the user device 224.

Figure 2E:
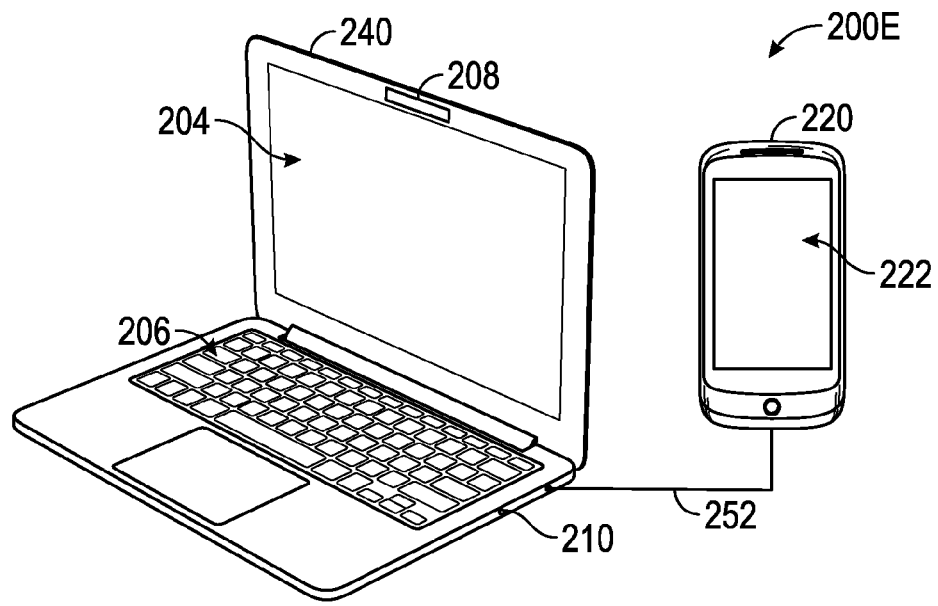
Figure 2F:
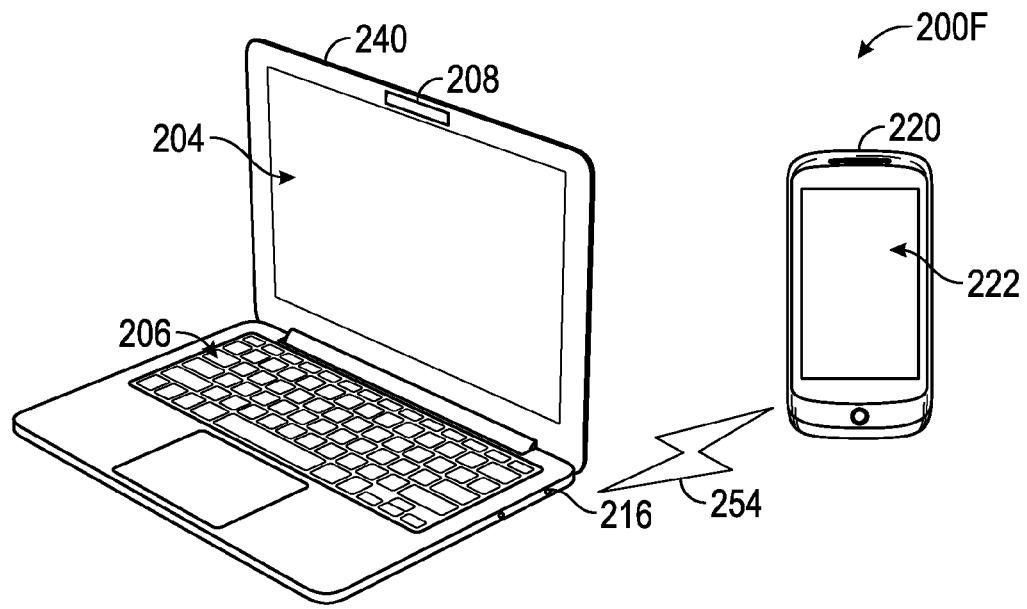

FIGS. 2E and 2F illustrate perspective views 200E, 200F of user devices 220, 240 being interconnected to provide multi-display video conferencing. FIG. 2E shows that the user device 240 includes the display device 204, user input devices 206, and the ports 210, as described in connection with FIG. 2A. The user device 240 need not, but can, have a second display device, such as the display device 212 of FIG. 2B. The user device 240 can be connected to the user device 220 via a cable 252. Additionally or alternatively, FIG. 2F shows that the user device 240 can be coupled to the user device 220 via a wireless communication channel 254.

Figure 2G:
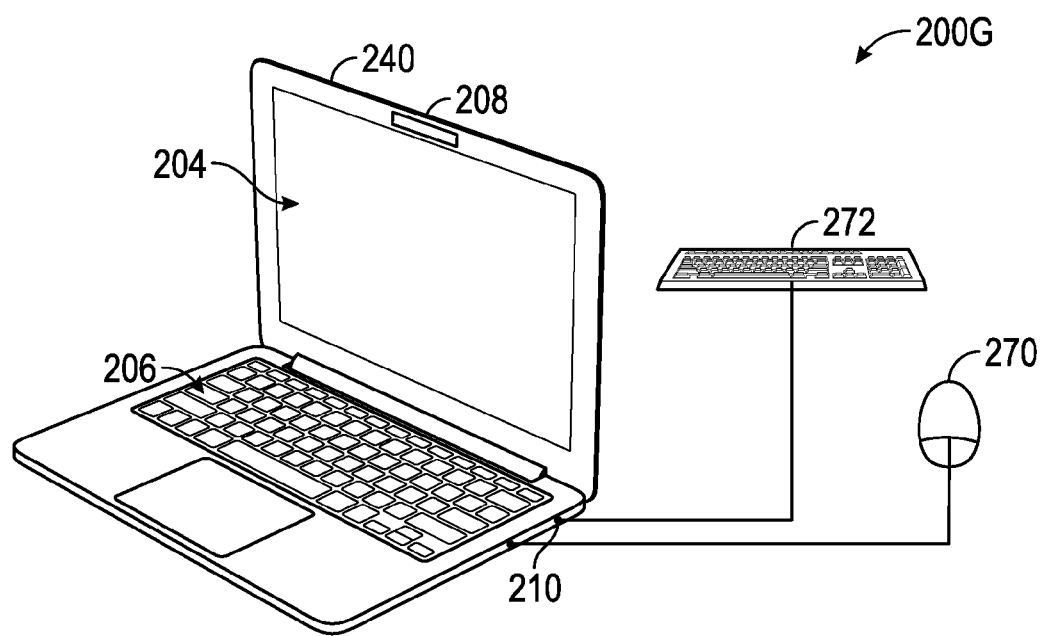

FIG. 2G illustrates a perspective view 200G of the user device 240 of FIGS. 2E and 2F that is interconnected with peripheral user devices 270, 272 via the ports 210. The peripheral user input devices 270, 272 can correspond to a mouse device and a keyboard.

The user input devices 206, 270, 272 can be assigned to a display device, such as any of the display devices 204, 212, 222. For example, the user input devices 206 can be linked to a first user, and the peripheral user input devices 270, 272 can be linked to a second user. As such, the first user can use the user input devices 206 to provide user input to a user interface rendered on the display device 204. Furthermore, the second user can use the peripheral user input devices 270, 272 to provide user input to a user interface rendered by a second display device (e.g., either of the display devices 212, 222).

Figure 3:
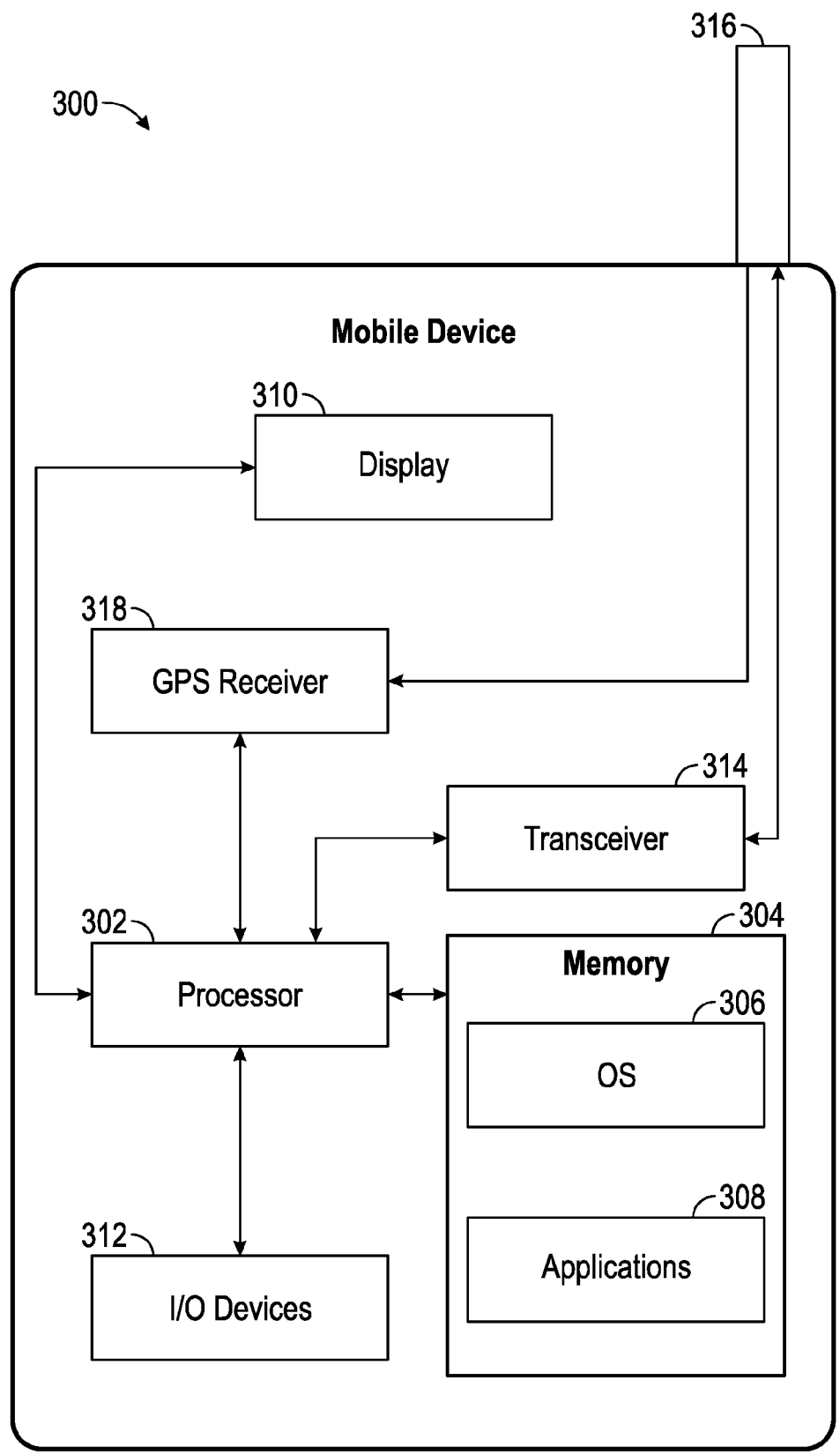
FIG. 3 is a block diagram illustrating a mobile device, according to an example embodiment.

FIG. 3 is a block diagram illustrating a mobile device 300, according to an example embodiment. The mobile device 300, which can correspond to a second user device (e.g., user device 220 of FIG. 2), can include a processor 302. The processor 302 can be any of a variety of different types of commercially available processors suitable for mobile devices (for example, an XScale architecture microprocessor, a Microprocessor without Interlocked Pipeline Stages (MIPS) architecture processor, or another type of processor). A memory 304, such as a random access memory (RAM), a Flash memory, or other type of memory, is typically accessible to the processor 302. The memory 304 can be adapted to store an OS 306, as well as application programs 308, such as a mobile location-enabled application that can provide Location Based Services (LBSs) to a user. The processor 302 can be coupled, either directly or via appropriate intermediary hardware, to a display 310 and to one or more input/output (I/O) devices 312, such as a keypad, a touch panel sensor, a microphone, and the like. Similarly, in some embodiments, the processor 302 can be coupled to a transceiver 314 that interfaces with an antenna 316. The transceiver 314 can be configured to both transmit and receive cellular network signals, wireless data signals, or other types of signals via the antenna 316, depending on the nature of the mobile device 300. Further, in some configurations, a global positioning system (GPS) receiver 318 can also make use of the antenna 316 to receive GPS signals.

Example Multi-Display Video Systems

Figure 4:
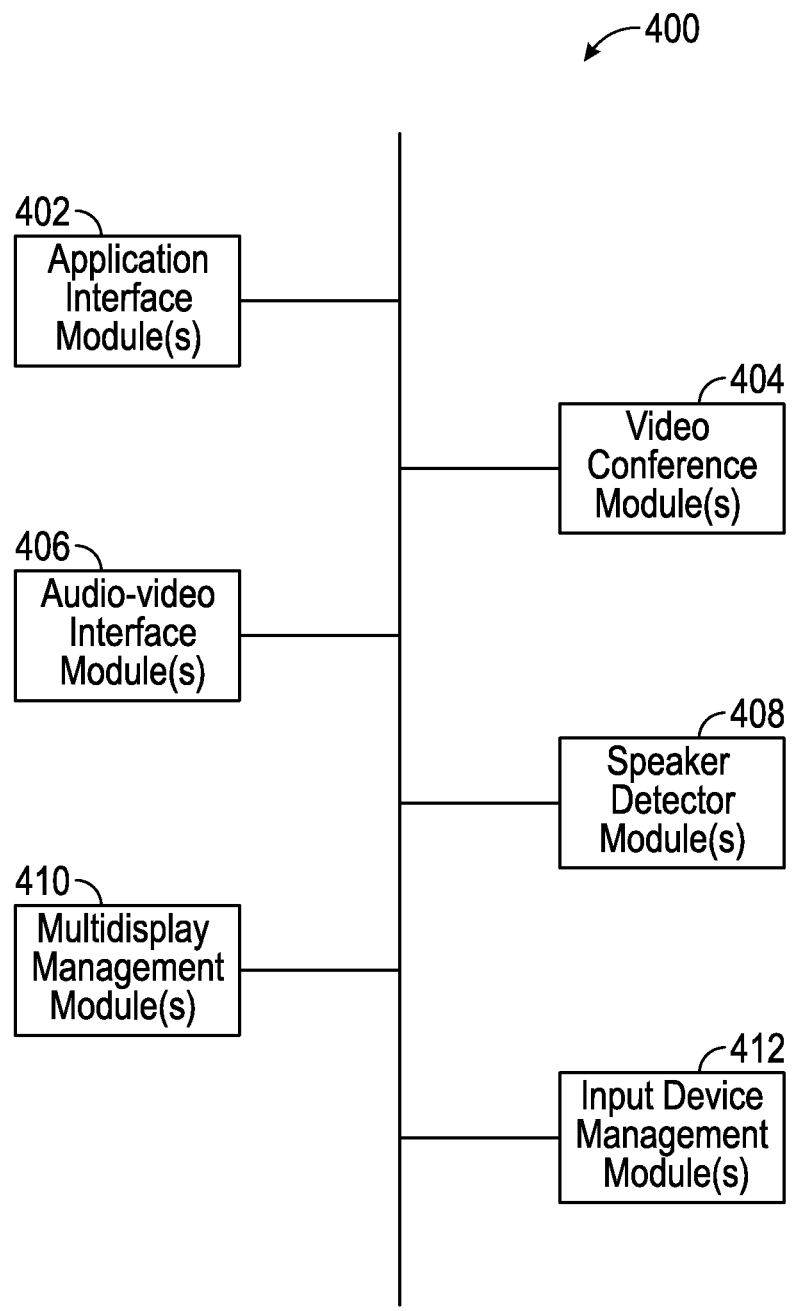
FIG. 4 is a block diagram illustrating an example embodiment of a multi-display video conference system including multiple modules forming at least a portion of the network system of FIG. 1.

FIG. 4 is a block diagram illustrating an example embodiment of a multi-display video system 400 including multiple modules forming at least a portion of the network system 100 of FIG. 1. The modules 402-412 of the multi-display video system 400 include an application interface module(s) 402, a video conference module(s) 404, an audio-video interface module(s) 406, a speaker detector module(s) 408, a multi-display management module(s) 410, and an input device management module(s) 412.

In some embodiments, the components of the multi-display video system 400 can be included in the user device 108 of FIG. 1. However, it will be appreciated that in alternative embodiments, one or more components of the multi-display video system 400 described below can be included, additionally or alternatively, in other devices, such as one or more of the user devices 114, 118, 122, 130, 134 of FIG. 1, the user devices 202, 220, 224, 240 of FIG. 2, or a separate device such as a server computer (not Shown) connected to the network 104 of FIG. 1. The server computer, executing one or more video conference applications, can support video conferencing services and can receive data from and transmit data to one or more of the user devices 114, 118, 122, 130, 134.

The modules 402-412 of the multi-display video system 400 can be hosted on dedicated or shared server machines (not Shown) that are communicatively coupled to enable communications between server machines. Each of the modules 402-412 are communicatively coupled (e.g., via appropriate interfaces) to each other and to various data sources, so as to allow information to be passed between the modules 402-412 of the multi-display video system 400 or so as to allow the modules 402-412 to share and access common data. The various modules of the multi-display video system 400 can furthermore access one or more databases.

The multi-display video system 400 can facilitate utilizing multiple display devices by the same user device. In one particular embodiment, the user device executes a video conference session that includes two users who use the multiple display devices. To this end, the multi-display video system 400 illustrated in FIG. 4 includes the application interface module(s) 402, the video conference module(s) 404, the audio-video interface module(s) 406, the speaker detector module(s) 408, the multi-display management module(s) 410, and the input device management module(s) 412. By way of explanation only, embodiments will be described below in a non-limiting context of two users and two display devices coupled to the user device. It will be appreciated that any number of users and any number of display devices can be utilized in alternative embodiments.

The application interface module(s) 402 can be a hardware-implemented module that can facilitate interfacing with and/or communicating data with an OS, other software programs, and/or client devices to facilitate video conferencing. For example, the application interface module(s) 402 can interface with the one or more APIs of an OS of the user device to perform operations to support video conferencing, such as transmitting display data to one or more displays of the user device, operating a recording device (e.g., a microphone, camera, etc.) of the user device, receiving audio and/or video data from the recording device, receiving user input from input devices (e.g., a keyboard, a mouse, a track pad, a touchscreen display, a voice-command device, a gesture-based device, etc.), accessing data storage devices, communicating data over a network, and the like.

As such, the application interface module(s) 402 can generate display data, including graphical user interface data, for display on a user device. Furthermore, the application interface module(s) 402 can receive user input data that is received by the user device from the user via a graphical user interface.

In operation, the application interface module(s) 402 can receive request messages to initiate a video conference session from a user device. The request message can correspond to user input received via a graphical user interface to initiate a video conference with a number of participants. In response, the application interface module(s) 402 can signal to one or more of the modules 404-412 to process the request.

The video conference module(s) 404 can be a hardware-implemented module which can facilitate initiating and processing a video conference session. For example, initiating the video conference session can be in response to the application interface module(s) 402 receiving a request message from a user of the user device, as stated above. The video conference session can include a first user, a second user, and one or more remote users. For example, the first and second users can be local to the user device and utilize the user device for participating in the video conference session with the remote user of a network, In operation, the video conference module(s) 404 can utilize the application interface module(s) 402 to initiate one or more communication channels over the network to support the video conference session. For example, video and audio data streams can be transmitted and received by the user device via the communication channels. The video and audio data streams can correspond to video and audio of the participants of the video session that are captured by respective recording devices.

The first and second users can utilize different display devices that are coupled to the user device. As described in connection with FIGS. 2A-G, a first display device can be integrated in the user device. Moreover, a second display device can either be integrated in the user device or integrated in a second user device that is communicatively coupled to the user device. In operation during a video conference session, the first user can be linked to the first display device, and the second user can be linked to the second display device.

In operation, the video conference module(s) 404 can provide display data for rendering on display devices, Display data can include graphical data and/or video and audio data. For example, the graphical data can correspond to components of a file or a graphical user interface of the video conference session. The graphical data can be private data with respect to the corresponding user or it can correspond to shared graphical. data (e.g., via a "share screen" mode). Video data can correspond to a digital video data stream of images captured by a recording device (e.g., camera) of the user device. Audio data can correspond to a digital audio data stream of sound captured by a recording device (e.g., microphone) of the user device. The video and audio data can be combined as a single video data stream.

The video conference module(s) 404 can provide a plurality of display data to respective display devices. In an example embodiment, the video conference module(s) 404 can mirror the display data of a first display device to a second display device. Additionally or alternatively, the video conference module(s) 404 can generate at least partially different first and second display data for the first and second display devices, respectively. For example, the first and second display data can include one or more mirrored elements and one or more different elements. In another example, the second display data can be independent to the first display data. Display data for user interfaces of the video conference session will be described in greater detail in connection with FIGS. 5 and 6.

In an example embodiment, the video conference module(s) 404 can include a number of video and/or audio coders-decoders (codecs) for encoding, decoding, and/or transcoding data, such as audio input data, video input data, display data, and like content data. Using a codec can improve efficiency of data communication and/or data storage, The audio-video interface module (s) 406 can be a hardware-implemented module that can facilitate operating one or more recording devices and receiving data generated by the recording devices. For example, a camera of the user device can be used to capture images of a user and generate a digital video data stream for a display of the video conference session. Additionally or alternatively, a microphone can be used to generate an audio data stream of audio of the user for the video conference session.

In an example embodiment, each display device coupled to a user device can be linked to a pair of audio and video recording devices. For example, the first display device (e.g., a front-facing LCD display integrated in a laptop) can be linked to a (e.g., front-facing) camera and/or microphone. The second display device (e.g., a rear-facing LCD display either integrated in or communicatively coupled. to the laptop) can be linked to a (e.g., rear-facing) camera and/or microphone. For example, the audio/video data streams generated by the corresponding recording devices can be associated with (e.g., included, combined, etc.) with an identifier that is indicative of the linked user or the linked display device.

The first display device can be colocated with the first microphone, and the second display device can be colocated with the second microphone. Herein, a display device being colocated with a microphone or other recording device can refer to, for example, the display device and the microphone being located with respect to each other so that a user can view the display device and the microphone can operate to capture audio of the user. For example, the display device and microphone can be located within close proximity and facing in substantially the same direction (e.g., approximately facing a location that a user would normally be located).

In an example embodiment, the first and second display devices have fixed locations, such as, for instance, two displays integrated in a laptop computer. Accordingly, in the example embodiment, the first microphone is located closer to the first display device than the first microphone is to the second display device. Additionally, the first microphone and the first display device can be directed in substantially the same direction. Likewise, the second microphone is located closer to the second display device than the second microphone is to the first display device. Additionally, the second microphone and the second display device can be directed in substantially the same direction.

It will be appreciated that, in alternative embodiments, the second display device does not necessarily have a fixed location relative to the first display device. For example, the second display device can be integrated in a second user device that is separate from the first user device and which can physically or wirelessly connect to the second user device, for instance, as was described in connection with FIGS. 2E and 2F. In such a case, the second user device can include one or more integrated recording devices that are substantially directed in the same direction of the second display device. However, the first and second display devices need not be front facing and rear facing relative to each other, The speaker detector module(s) 408 can be a hardware-implemented module which can facilitate processing the first and second audio input data to identify an active speaker between the first user and the second user. For example, in the case that the first user and the second user are in a video conference session that includes a remote user, an interface for the remote user can display a video data stream of either the first user or the second user depending on which of the users is actively speaking. The speaker detection module(s) 408 can process the first and second audio input to determine the active speaker, and then transmit data that is indicative of the active speaker to the remote user. The user device of the remote user can display the video data stream associated with the active speaker in a particular portion of the user interface, as will be described in connection with FIGS. 5 and 6. Video data streams of non-active speakers can also be displayed, for instance, in smaller frames of the user interface.

An example method for processing audio input data to identify an active speaker is described in greater detail in connection with FIG. 8.

The multi-display management module(s) 410 can be a hardware-implemented module that can facilitate providing user interfaces for display on the first and second display devices. The multi-display management module(s) 410 can provide mirrored display data for the first and second display devices such that the first and second displays render similar displays. In an alternative example embodiment, the multi-display management module(s) 410 can provide different display data for the first and second display devices.

Moreover, the user interfaces can be configurable based on display type and/or based on user input. For instance, the multi-display management module(s) 410 can maintain interface definition data that includes data that is indicative of visibility attributes for elements of the user interface. The multi-display management module(s) 410 can be operatively coupled to the video conference module(s) 404. As such, the video conference module(s) 404 can generate and/or provide display data to the display devices such that a number of display elements are included or omitted from the displays in accordance with the interface definition data.

In operation of an example embodiment, a first user can select a user interface element from the user's display as being either visible or not visible to other users. The multi-display management module(s) 410 can update the interface definition data in response to and in accordance with the user's selection. Furthermore, the video conference module(s) 404 can update the display data automatically in response to user's action.

In operation of another example embodiment, the multi-display management module(s) 410 can receive data that is indicative of display characteristics of the second display device. Examples of the display characteristics can include, for instance, the physical display size, display resolution, refresh rate, display type, and like attributes of the second display device. The multi-display management module(s) 410 can update the interface definition data based on the display characteristics of the second display. For instance, the multi-display management module(s) 410 can determine the number of interface elements to be displayed on the second display device based on the physical size and/or the resolution of the second display device. As such, the multi-display management module(s) 410 can facilitate automatic configuration of the second display.

The input device management module(s) 412 can be a hardware-implemented module that can facilitate management of user input devices coupled to the user device. For instance, one or more user input devices can be linked to respective users.

In operation of an example embodiment, the video conference module(s) 404 can receive user input indicative of a request linking selected user input devices to a selected user. For instance, each user input device can initially be linked to the first user. As such, the input device management module(s) 412 is further configured to detect connected user input devices. This detection can occur during startup of the video conference application arid/or session and, in some example embodiments, during the video conference session. As a default, the input device management module(s) 412 can link certain detected connected user input devices to the first user. Additionally or alternatively, certain types of user input devices can automatically be linked to the second user, such as a touchscreen-type input device connected to the second display device. The first user can provide input to link a selected connected user input devices to the second user so that the second user can use the selected user input device.

Example Multi-Display Conferencing User Interfaces

Figure 5:
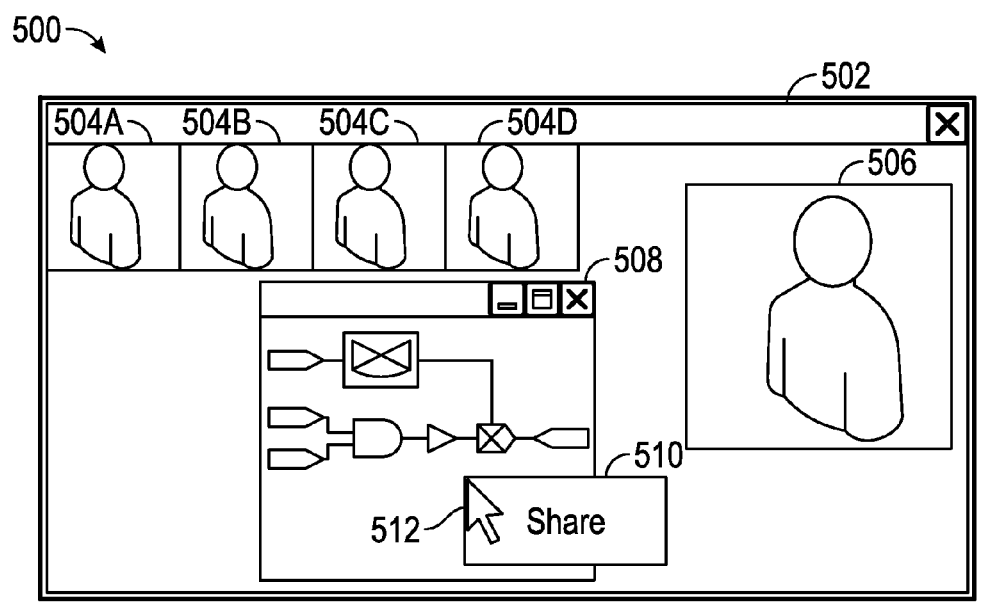
FIG. 5 is an interface diagram illustrating an example user interface of a first display delivered to a user device by a multi-display video system, according to an example embodiment.

FIG. 5 is an interface diagram illustrating an example user interface 500 of a first display delivered to a user device by a multi-display video system 400, according to an example embodiment. The user device can correspond to any of the user devices 202, 220, 224, 240 of FIGS. 2A-G, The user interface 500 can be rendered on any of the display devices 204.

For illustration purposes only, and not by way of limitation, FIG. 5 illustrates a use case in which the multi-display video system 400 provides display data to render the user interface 500 on the first display device for the operator of the user device. As will be described in greater detail in connection with FIG. 6, the multi-display video system 400 can also provide display data to render a second user interface on a second display device for a secondary user. The term secondary user can refer to a user who is provided access to the video conference session via the second display device and, if any, input devices linked to the second display device.

The user interface 500 includes a frame 502 for presenting one or more elements for facilitating video conferencing. The frame 502 includes elements 504A-D and 506-510. A pointer 512 can be used by the operator user to interact with the user interface 500. It will he appreciated that one or more components (e.g., the pointer 512) of the user interface 500 can be omitted in an alternative embodiment.

In an example embodiment, the user interface 500 can correspond to a video conference session between a number of users. In the illustrated example embodiment of FIG. 5, the frame 502 includes the frames 504A-D, 506 for displaying video data streams or graphical representations of respective users participating in the video conference session. For example, the video data streams can be provided by a recording device (camera and/or microphone) that captures video and/or audio that is linked to the corresponding user. In an example embodiment, if a user does not have a camera for generating a video data stream, or if the user has turned off the camera, graphics can be displayed in the corresponding user's frame.

Over the course of the video conference session, the frames 504A-D, 506 render data associated with different users based on which users are speaking In particular, the frames 504A-D can correspond to non-active speakers, The frame 506 can display video data streams or graphical representations of the active speaker. In an example embodiment, the active speaker can correspond to the user Who last provided sufficient audio input. For example, sufficient audio input can be determined based on audio input exceeding a volume/energy threshold for a duration that exceeds a time threshold. The active speaker can remain the active speaker until another user provides sufficient audio input.

In an example embodiment, the user displayed in the frame 506 can always correspond to the active speaker, even Where the operator user is the active speaker. This operation can allow the operator user to clearly view the video stream of the operator user that is provided to other users and thus provide visual feedback to the operator user. In an alternative example embodiment, the user displayed in the frame 506 can correspond to the active speaker unless the active speaker is the operator user. In such a case where the operator user is the active speaker, the frame 506 displays the previous active user. In this way, the user interface 500 can simulate "face-to-face" conversations between two users in a conversation.

Additionally or alternatively, the multi-display video system 400 can provide display data for the user interface 500 such that frame 506 does not display the video data stream and/or graphic of the secondary user for the operator user. For instance, if the active speaker corresponds to the secondary user, the frame 506 can display the user who was the previous non-secondary and non-operator user active speaker. In this case, the operator user can see the secondary person in real life because the two users are colocated.

In an example embodiment, the user interface 500 can facilitate screen. sharing capabilities. For example, the frame 502 includes the frame 508 which can correspond to a frame of an application executed on the user device. In the illustrated example embodiment, the operator user can select the frame 508 to provide input to determine whether or not the frame 508 is visible to the other users. As shown, the operator user can use the pointer 512 to bring up the window 510 and select the menu item "SHARE" to indicate to the multi-display video system 400 to make the frame 508 visible to the other users. Visibility can be determined globally for all participants of the video conference session or on a user-to-user basis (e.g., the operator user can select which users can view the frame 508).

Figure 6:
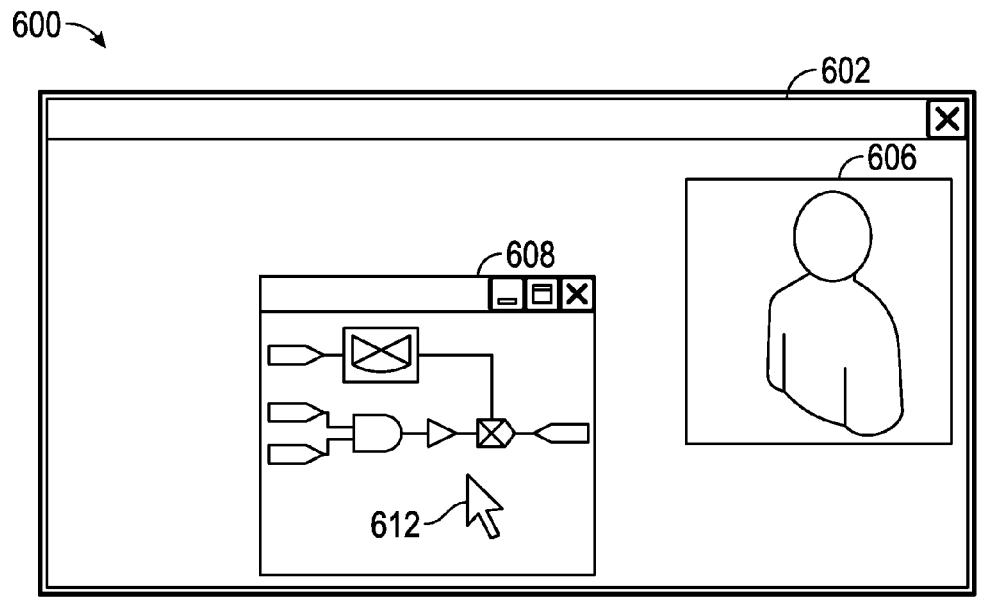
FIG. 6 is an interface diagram illustrating an example user interface of a second display delivered to a user device by a multi-display video system, according to an example embodiment.

FIG. 6 is an interface diagram illustrating an example user interface 600 of a second display delivered to a user device by a multi-display video system, according to an example embodiment. The user device can correspond to any of the user devices 202, 220, 224, 240 of FIGS. 2A-G. The user interface 600 can be rendered on any of the display devices 212, 222.

For illustration purposes only, and not by way of limitation, FIG. 6 illustrates a use case in which the multi-display video system 400 provides display data to render the user interface 600 on the second display device for the secondary user of the user device in conjunction with the user interface 500 of FIG. 5 for the operator user. The user interface 600 includes a frame 602 for presenting one or more elements for facilitating video conferencing. In particular, the frame 602 includes frames 606, 608 and the pointer 612 for facilitating user input. It will be appreciated that in an alternative embodiment that one or more components (e.g., the frames 606, 608 and/or the pointer 612) of the user interface 600 can be omitted.

The frame 606 can be used to render the video data stream or graphics associated with the active speaker of the video conference session. The frame 608 can correspond to a frame shared by one of the users (e.g., the operator user as described above in connection with FIG. 5) of the video conference session. In operation, the frame 606 can operate in a manner similar to the frame 506 of FIG. 5 as described above.

In example embodiments, the pointer 612 can be controlled by the secondary user or can correspond to a mirror of the pointer 512 of FIG. 5. Where the pointer 612 mirrors the pointer 512, the pointer 612 can be controlled by the operator user. Additionally or alternatively, the user interface 600 can include a second pointer (not shown) to facilitate user input from the secondary user.

In operation, if the operator user has selected the frame 508 to be not shared (or termed "invisible" or "private"), the frame 608 of the frame 602 can be removed from the user interface 600.

As shown, the user interface 600 can include fewer elements than the user interface 500. In this way, the user interface 600 can be displayed on a display device that is physically smaller than the first display device or that has a resolution that is lower than the resolution of the first display device.

Example Multi-Display Conferencing Processes

FIG, 7 is a flowchart illustrating an example method 700 of providing multi-display conferencing, in accordance with an example embodiment. In this example, the method 700 can include operations such as initiating a video conference session (block 704), receiving first and second audio input data (block 706), processing the first and second audio input data to identify an active speaker (block 708), and generating a speaker selection message (block 710). The example method 700 will be described below, by way of explanation, as being performed by certain modules. It will be appreciated, however, that the operations of the example method 700 can be performed in any suitable order by any number of the modules shown in FIG. 4.

The method 700 starts at block 702 and proceeds to block 704 for initiating the video conference session that includes a first user, a second user, and a remote user. The first and second users (e.g., users 110, 112 of FIG. 1) can participate in the video conference session by using the same user device (e.g., the user device 108 of FIG. 1). The remote user can correspond to any user using a separate user device, such as the users 116, 120, 124-128, 132, 136. Moreover, it will be appreciated that the remote user can correspond to a user located at the same location (e.g., access node 102A of FIG. 1) of the first and second users, where the remote user uses a user device that is different from the user device shared by the first and second users.

The user device shared by the first and second users can be coupled to two separate display devices. The first user can be linked to a first display device coupled to the user device. The second user can be linked to a second display device coupled to the user device. As such, the user device can provide the first and second users separate or mirrored displays.

Recording devices can capture video and audio of the users during the video conference session. At block 706, the audio-video interface module(s) 406 can receive first and second audio input data. The first audio input data can be linked to a first microphone that is associated with the first display device. The second audio input data can be linked to a second microphone that is associated with the second display device.

At block 708, the speaker detector module(s) 408 can process the first and second audio input data to identify an active audio signal between the first and second audio input data. The active audio input signal corresponds to the audio input data linked to the active speaker between the first user and the second user. The processing of block 708 can be performed. based on, or in response to, a determination that the first and second audio input data are linked to the same user device. The determination can be made by comparing identifier data (e.g., the network address or user device identifier of the originating user device) of the first and second audio input data. An example method of processing the audio input data will be described in greater detail in connection with FIG. 8.

In an example embodiment, a user device (e.g., the user device 108 of FIG. 1) performs the processing of block 708. The processing can include processing the audio input data linked to each user linked to the user device. In this way, each user device participating in the video conference session can resolve who is the active speaker linked to the corresponding user device.

In another example embodiment, a server computer receives the audio data of each user of the video conference session. The first and second audio input data can selected for group processing from the received audio input data based on being linked to the same user device. For example, the server computer can determine which user device is linked to the audio input data based on the sender's network address of received audio input data and/or based on identification data included in the audio input data. The server computer can group the audio input data by user devices and process each group separately. in this way, the speaker detection module(s) 408 can resolve the active speaker in a centralized manner.

At block 710, the video conference module(s) 404 can generate a speaker selection message for the remote user to display images of the active speaker. For example, a user interface of the remote user can correspond to the user interface 500 of FIG. 5. In response to receiving the speaker selection message, which can include a user identifier indicative of the active speaker, the frame 506 can display the video or graphics of the user who is identified as the active speaker. The non-active speakers can be displayed in the frames 504A-D.

Figure 7:
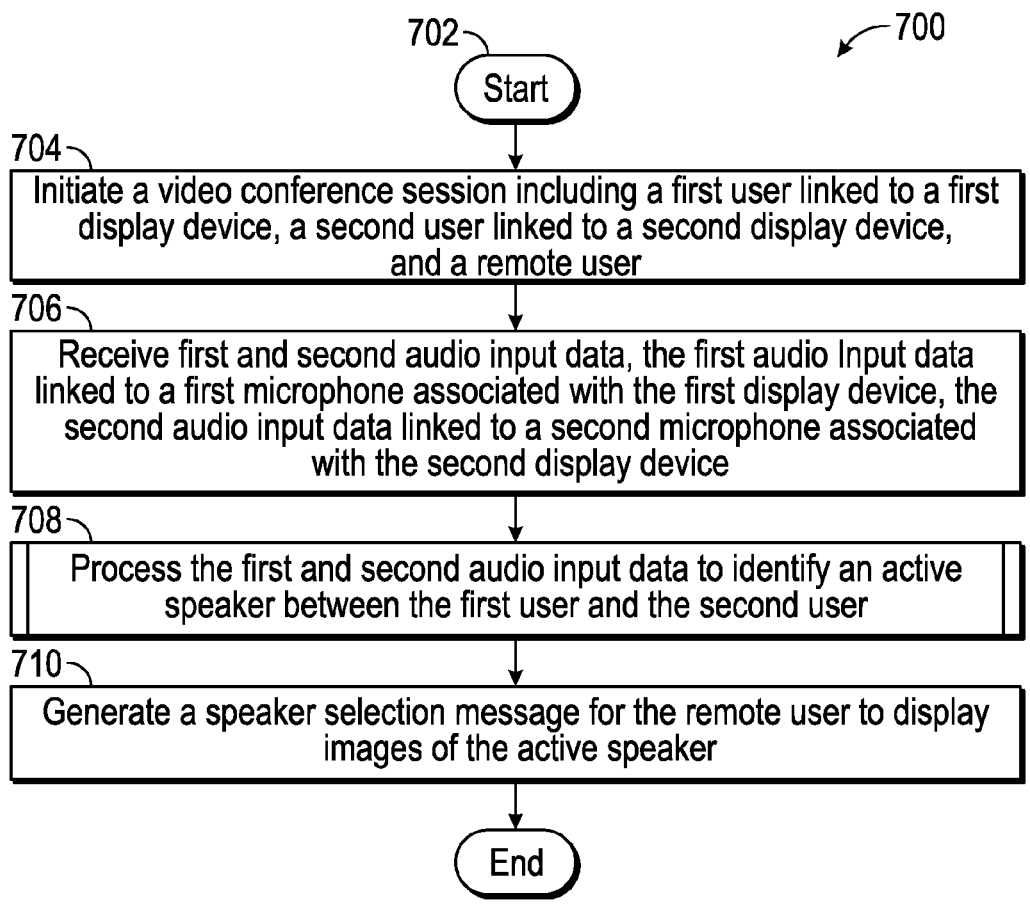
FIG. 7 is a flowchart illustrating an example method of providing multi-display conferencing, in accordance with an example embodiment.
Figure 8:
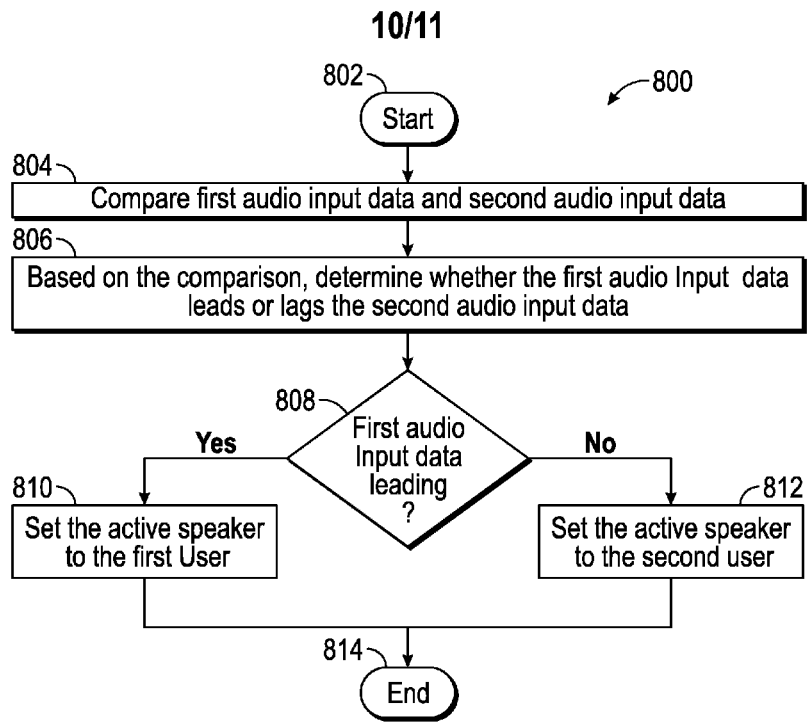
FIG. 8 is a flowchart illustrating an example method of processing audio input data of a multi-display video system, in accordance with an example embodiment.

FIG. 8 is a flowchart illustrating an example method 800 of processing audio input data of a multi-display video system, in accordance with an example embodiment. The method 800 can correspond to an example method embodied by the block 708 of FIG. 7. In this example, the method 800 can include operations such as determining a phase difference (block 804), determining whether the first audio input data leads or lags (block 806), and setting the active speaker (blocks 810, block 812). The example method 800 will be described below, by way of explanation, as being performed by certain modules. It will be appreciated, however, that the operations of the example method 800 can be performed in any suitable order by any number of the modules shown in FIG, 4. By way of illustration only, and not by way of limitation, the method 800 will be described in the context of processing two sets of audio input data. It will be appreciated, however, that in alternative example embodiments any suitable number of sets of audio input data can be processed together.

The method 800 starts at block 802 and proceeds to blocks 804, wherein the speaker detection module(s) 408 compares first audio input data and the second audio input data. As stated, the first and second audio input data can be the audio input data linked to the same user device, such as user device 108 of FIG. 1. In an example embodiment, the user device performs the comparison of block 804. In this case, the comparison can. include audio input data of each user of the video conference session who is using the user device. In another example embodiment, a server computer receives the audio data of each user of the video conference session. The first and second audio input data are selected from the received audio input data based on being linked to the same user device. The server computer can group the audio input data based on user devices and process each group separately.

For example, a comparison can be used to determine which microphone records a sound first, which indicates that the user linked to the corresponding microphone is the active speaker between the first and second users. The speaker detection module(s) 408 can perform the comparison using a number of approaches, including a time-delay estimate approach, cross-correlation, beam-steering, and the like techniques. For example, a cross correlation R of the first audio input data (denoted as "$x_1$") and the second audio input data (denoted as "$x_2$") can be determined according to the following equation:

$$R_{x1,x2}(\tau)=\Sigma_{n=0}^{N}x_1(n)x_2(n+\tau) \qquad \text{(EQN. 1)}$$

In Equation 1, the argument τ can represent the time difference between the $x_1$ and $x_2$ and N can represent the number of samples of the audio signal being processed. The speaker detection module(s) 408 can evaluate Equation 1 for various arguments τ1, τ2, τ3, and so on, and select the argument $\tau_M$ that provides the largest cross-correlation R. A positive $\tau_M$ can indicate that the second audio input data $x_2$ leads the first audio input data $\tau_1$ (e.g., the second microphone records the sound before the first microphone). A negative $\tau_M$ can indicate that the second. audio input data $x_2$ lags the first audio input data $x_1$ (e.g., the second microphone records the sound after the first microphone).

As another example, the speaker detection module(s) 408 can perform the comparison by determining the signal energy $E_1$ (e.g., $E_1=\Sigma_{n=0}^{N}x_1^2(n)$) of the first audio input data and. the signal energy $E_2$ (e.g., $E_2=\Sigma_{n=0}^{N}x_2^2(n)$) of the second audio input data. The signal energy $E_1$, $E_2$ having the greatest value can be indicative that the user who is linked to the corresponding microphone is the active speaker. For example, the signal energy $E_1$ being greater than $E_2$ is indicative that the first user is the active speaker. The signal energy $E_1$ being less than $E_2$ is indicative that the second user is the active speaker.

At block 806, the speaker detection module(s) 408 determines whether the first audio input data leads or lags the second audio input data. The determination can be made based at least partly on the comparison performed at block 804, as described above. At block 808, the speaker detection module(s) 408 moves to either block 810 or block 812 based on whether the first audio input data leads the second audio input data. At block 810, in response to a determination that the first audio input data is leading, the speaker detection module(s) 408 sets the active speaker to the first user. At block 812, in response to a determination that the first audio input data is not leading, the speaker detection module(s) 408 sets the active speaker to the second user. After setting the active speaker at either block 810 or block 812, the method 800 can end at block 814.

Figure 9:
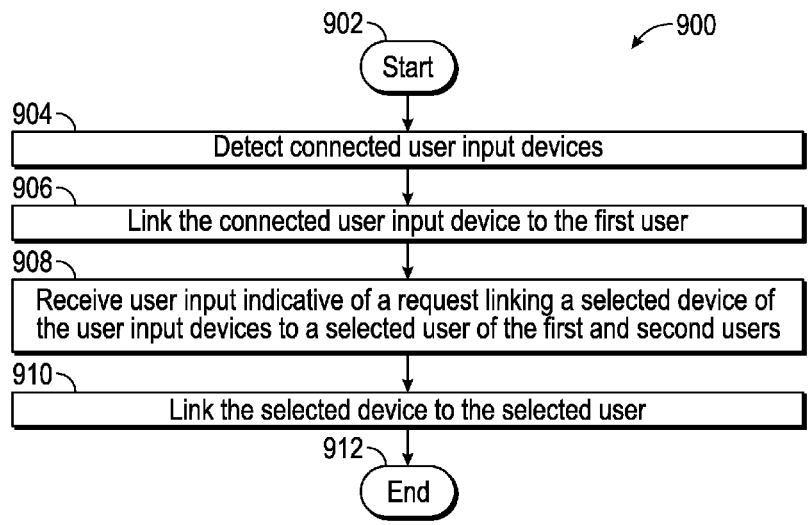
FIG. 9 is a flowchart illustrating an example method of assigning user input devices to users of a multi-display video system, in accordance with an example embodiment.

FIG. 9 is a flowchart illustrating an example method 900 of assigning user input devices to users of a multi-display video system, in accordance with an example embodiment. In particular, the method 900 can be used to assign user input devices to a plurality of users of the same user device. In this example, the method 900 can include operations such as detecting connected user input devices (block 904), linking a connected user input device to the first user (block 906), receiving user input indicative of a request to link a selected device of the user input devices to a selected user of the first and second users (block 908), and linking the selected device to the selected user (block 910). The example method 900 will be described below, by way of explanation, as being performed by certain modules. It will be appreciated, however, that the operations of the example method 900 can be performed in any suitable order by any number of the modules shown in FIG. 4.

The method 900 starts at block 902 and proceeds to block 904, wherein the input device management module(s) 412 detects connected user input devices. At block 906, the input device management module(s) 412 can link the detected connected user input devices to the first user. For example, user input devices can initially be connected to the first user as a default setting. At block 908, the input device management module(s) 412 can receive user input that is indicative of a request to link a selected device to a selected user. For example, the first user can select one or more peripheral user input devices (e.g., as shown in FIG. 2G) to be linked to a secondary user. At block 910, the input device management module(s) 412 can link the selected device to the selected user such that a user input that is received from the selected device is associated with the selected user. At block 912, the method 900 can end.

Certain embodiments are described herein as including logic or a number of components, modules, or mechanisms. Modules constitute either software modules (e.g., code embodied (1) on a non-transitory machine-readable medium or (2) in a transmission signal) or hardware-implemented modules. A hardware-implemented module is tangible unit capable of performing certain operations and can be configured or arranged in a certain manner. In example embodiments, one or more computer systems (e.g., a standalone, client or server computer system) or one or more processors are configured by software (e.g., an application or application portion) as a hardware-implemented module that operates to perform certain operations as described herein.

In various embodiments, a hardware-implemented module are implemented mechanically or electronically. For example, a hardware-implemented module can comprise dedicated circuitry or logic that is permanently configured (e.g., as a special-purpose processor, such as an FPGA or an ASIIC) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) are driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple of such hardware-implemented modules exist contemporaneously, communications can be achieved through signal transmission (e.g., over appropriate circuits and buses) that connect the hardware-implemented modules. In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation, and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations, Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., Application Program Interfaces (APIs).)

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected, by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be made based on various technical considerations. Below are set out hardware (e.g., machine) and software architectures that can be deployed, in various example embodiments.

Figure 10:
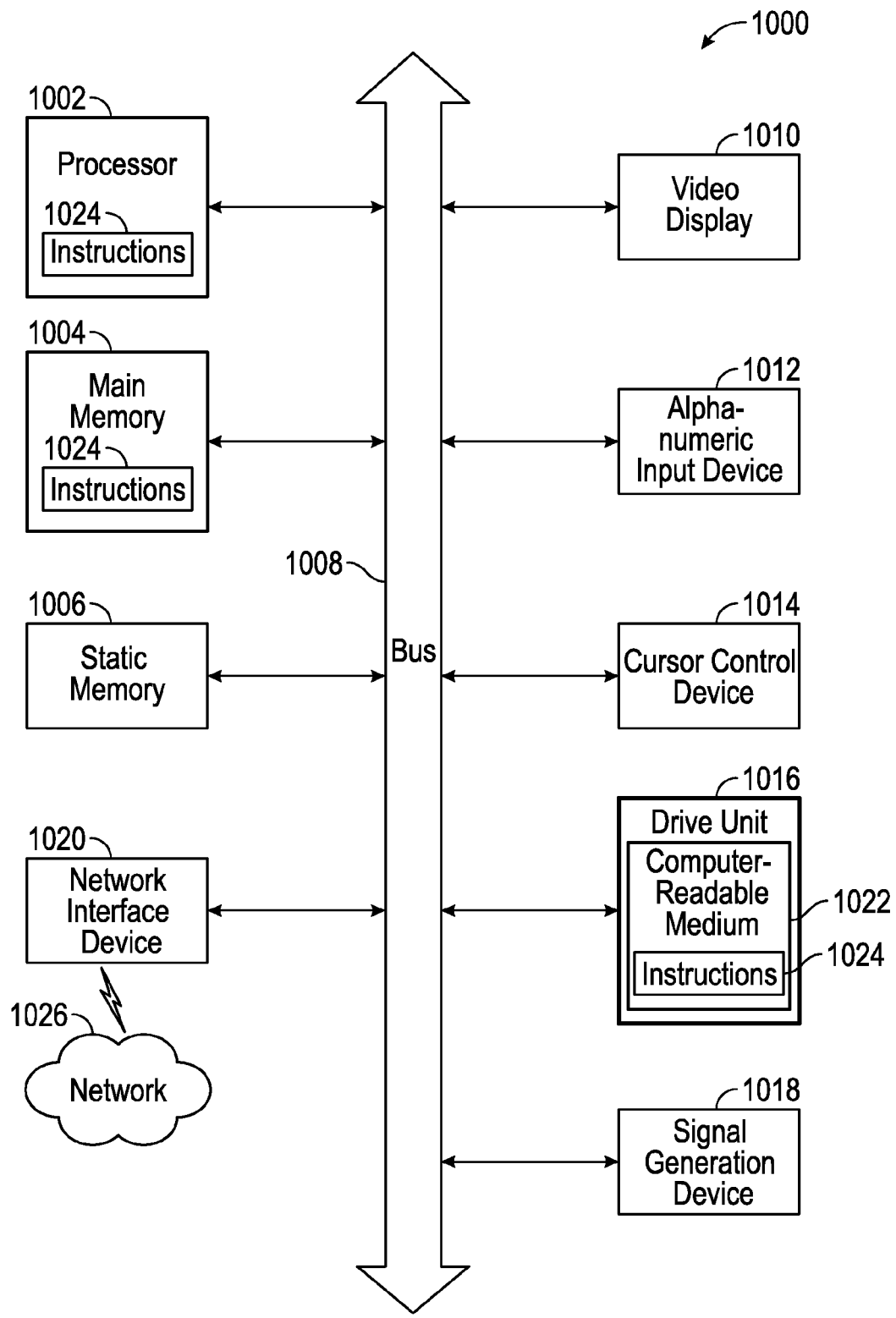
FIG. 10 is a block, diagram of a machine in the example form of a computer system within which instructions can be executed for causing the machine to perform any one or more of the methodologies discussed herein.

FIG. 10 is a block diagram of a machine in the example form of a computer system 1000 within which instructions 1024 can be executed for causing the machine to perform any one or more of the methodologies discussed herein. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a PC (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 can further include a video display unit 1010 (e.g., a liquid crystal display (LCD) or a cathode ray tube (CRT)). The computer system 1000 also includes an alpha-numeric input device 1012 (e.g., a keyboard or a touch-sensitive display screen), a user interface navigation (or cursor control) device 1014 (e.g., a mouse), a disk drive unit 1016, a signal generation device 1018 (e.g., a speaker), and a network interface device 1020.

The disk drive unit 1016 includes a. computer-readable medium 1022 on which is stored one or more sets of data structures and instructions 1024 (e.g., software) embodying or utilized by any one or more of the methodologies or functions described herein. The instructions 1024 can also reside, completely or at least partially, within the main memory 1004 and/or within the processor 1002 during execution thereof by the computer system 1000, with the main memory 1004 and the processor 1002 also constituting machine-readable media.

While the computer-readable medium 1022 is shown in an example embodiment to be a single medium, the term "computer-readable medium" can include a single medium or multiple media (e.g., a centralized or distributed database, and/or associated caches and servers) that store the one or more instructions 1024 or data structures. The term "computer-readable medium" shall also be taken to include any non-transitory, tangible medium that is capable of storing, encoding or carrying instructions 1024 for execution by the machine and that cause the machine to perform any one or more of the methodologies of the present inventive subject matter, or that is capable of storing, encoding or carrying data structures utilized by or associated with such instructions. The term "computer-readable medium" shall accordingly be taken to include, but not be limited to, solid-state memories, and optical and magnetic media. Specific examples of computer-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disk read only memory (CD-ROM) and digital video disc read only memory (DVD-ROM) disks.

The instructions 1024 can further be transmitted or received over a communications network 1026 using a transmission medium. The instructions 1024 can be transmitted using the network interface device 1020 and any one of a number of well-known transfer protocols (e.g., hypertext transfer protocol (HTTP)). Examples of communication networks include a local area network (LAN), a WAN, the Internet, mobile telephone networks, Plain Old Telephone (POTS) networks, and wireless data networks (e.g., WiFi and WiMax networks). The term "transmission. medium" shall be taken to include any intangible medium that is capable of storing, encoding, or carrying instructions (e.g., instructions 1024) for execution by the machine, and includes digital or analog communications signals or other intangible media to facilitate communication of such software.

Although the inventive subject matter has been described with reference to specific example embodiments, it will be evident that various modifications and changes can be made to these embodiments without departing from the broader spirit and scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A system comprising:
    an audio-video interface module configured to receive first and second audio input data and first and second video input data of a video conference session, the first audio input data and the first video input data being linked to a first display device of a first user device, the second audio input data and the second video input data being linked to a second display device of the first user device;
    a speaker detector module, including one or more processors, configured to process, based on a determination that the first and second audio input data are linked to the first user device, the first and second audio input data to identify an active audio signal, the speaker detector module being further configured to process the first and second audio input data by being configured to:
    compare the first audio input data and the second audio input data;
    based on the comparison, determine whether the first audio input data leads or lags the second audio input data; and either
        in response to a determination that the first audio input data leads the second audio input data, identify the first audio input data as the active audio signal; or
        in response to a determination that the first audio input data lags the second audio input data, identify the second audio input data as the active audio signal; and
    a video conference module configured to either:
        based on an identification of the first audio input data as the active audio signal, provide to a second user device a first message to display the first video input data in an active speaker display frame; or
        based on an identification of the second audio input data as the active audio signal, provide to the second user device a second message to display the second video input data in the active speaker display frame.

2. The system of claim 1, wherein the video conference module is further configured to provide first display data for the first display device and second display data for the second display device.

3. The system of claim 1, wherein the first user device corresponds to a personal computer device comprising the video conference module, the audio-video interface module, the speaker detector module, and the first and second display devices.

4. The system of claim 3, wherein the first display device corresponds to a front-facing display of the personal computer device, and the second display device corresponds to a rear-facing display of the personal computer device.

5. The system of claim 1, wherein the first user device corresponds to a personal computer device comprising the video conference module, the audio-video interface module, the speaker detector module, and the first display device, wherein the second display device corresponds to a display integrated in a third device that is separate from the personal computer device, the personal computer device being communicatively coupleable to the third device.

6. The system of claim 1, wherein the first audio input data corresponds to audio data generated by a first microphone linked to the first display device, wherein the second audio input data corresponds to audio data generated by a second microphone linked to the second display device.

7. The system of claim 6, wherein the first display device is colocated with the first microphone and the second display device is colocated with the second microphone.

8. The system of claim 6, wherein the first microphone is located closer to the first display device than the second display device, wherein the second microphone is located closer to the second display device than the first display device.

9. The system of claim 1, further comprising a multi-display management module configured to provide an interface definition indicative of a visibility characteristic of a display element, wherein the video conference module is configured to generate second display data for the second display device such that the second display device renders the display element in accordance with the interface definition.

10. The system of claim 9, wherein the multi-display management module is further configured to receive user input data linked to the first display device, the user input data being indicative of a value of the visibility characteristic of the display element, the multi-display management module being configured to set the visibility characteristic in accordance with the user input data.

11. The system of claim 1, further comprising an input device management module configured to interface with user input devices, wherein the video conference module is configured to receive user input indicative of a request linking a selected device of the user input devices to a selected one of the first and second display devices.

12. The system of claim 11, wherein the input device management module is further configured to detect a connected user input device, wherein the video conference module is configured to link the connected user input device to the first display device in response to a detection of the connected first user device, wherein the user input indicative of the request corresponds to a request linked to the first display device to link the connected user input device to the second display device.

13. A computer-implemented method comprising:
receiving first and second audio input data and first and second video input data of a video conference session, the first audio input data and the first video input data being linked to a first display device of a first user device, the second audio input data and the second video input data being linked to a second display device of the first user device;
based on a determination that the first and second audio input data are linked to the first user device, processing, by one or more processors, the first and second audio input data to identify an active audio signal in a process comprising:
comparing the first audio input data and the second audio input data;
based on the comparison, determining whether the first audio input data leads or lags the second audio input data; and either
in response to the determining that the first audio input data leads the second audio input data, identifying the first audio input data as the active audio signal; or
in response to the determining that the first audio input data lags the second audio input data, identifying the second audio input data as the active audio signal; and either
based on an identification of the first audio input data as the active audio signal, providing to a second user device a first message to display the first video input data in an active speaker display frame; or
based on an identification of the second audio input data as the active audio signal, providing to the second user device a second message to display the second video input data in the active speaker display frame.

14. The computer-implemented method of claim 13, wherein the first and second display devices are included by a person computer device.

15. The computer-implemented method of claim 14, wherein the first display device corresponds to a front-facing display of the personal computer device, and the second display device corresponds to a rear-facing display of the personal computer device.

16. The computer-implemented method of claim 13, wherein the first display device is included by a personal computer device, wherein the second display device corresponds to a display integrated in a third device that is separate from the personal computer device, the personal computer device being communicatively coupleable to the third device.

17. A non-transitory machine-readable storage medium embodying instructions that, when executed by a machine, cause the machine to perform operations comprising:
receiving first and second audio input data and first and second video input data of a video conference session, the first audio input data and the first video input data being linked to a first display device of a first user device, the second audio input data and the second video input data being linked to a second display device of the first user device;
based on a determination that the first and second audio input data are linked to the first user device, processing, by one or more processors, the first and second audio input data to identify an active audio signal in a process comprising:
comparing the first audio input data and the second audio input data;
based on the comparison, determining whether the first audio input data leads or lags the second audio input data; and either
in response to a determination that the first audio input data leads the second audio input data, identifying the first audio input data as the active audio signal; or
in response to a determination that the first audio input data lags the second audio input data, identifying the second audio input data as the active audio signal; and either
based on an identification of the first audio input data as the active audio signal, providing to a second user device a first message to display the first video input data in an active speaker display frame; or
based on an identification of the second audio input data as the active audio signal, providing to the second user device a second message to display the second video input data in the active speaker display frame.

18. The non-transitory machine-readable storage medium of claim 17, wherein the first and second display devices are included by a person computer device.

19. The non-transitory machine-readable storage medium of claim 18, wherein the first display device corresponds to a front-facing display of the personal computer device, and the second display device corresponds to a rear-facing display of the personal computer device.

* * * * *